United States Patent
Calhoun

(10) Patent No.: US 11,703,070 B2
(45) Date of Patent: *Jul. 18, 2023

(54) CLAMP FOR MOUNTING AND POSITIONING AN ARTICLE THEREON

(71) Applicant: Perry Calhoun, Bardstown, KY (US)

(72) Inventor: Perry Calhoun, Bardstown, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/701,653

(22) Filed: Dec. 3, 2019

(65) Prior Publication Data

US 2020/0224685 A1 Jul. 16, 2020

Related U.S. Application Data

(63) Continuation-in-part of application No. 16/283,299, filed on Feb. 22, 2019, now Pat. No. 10,495,953.

(60) Provisional application No. 62/634,121, filed on Feb. 22, 2018.

(51) Int. Cl.
| | |
|---|---|
| *F16B 2/10* | (2006.01) |
| *G03B 17/56* | (2021.01) |
| *F16M 11/12* | (2006.01) |
| *F16M 13/02* | (2006.01) |

(52) U.S. Cl.
CPC ............ *F16B 2/10* (2013.01); *F16M 11/128* (2013.01); *F16M 13/02* (2013.01); *G03B 17/56* (2013.01)

(58) Field of Classification Search
CPC ...... F16B 2/10; Y10T 24/3443; G03B 17/561
See application file for complete search history.

(56) References Cited

U.S. PATENT DOCUMENTS

| | | | |
|---|---|---|---|
| 3,346,293 A | 10/1967 | Wilcox | |
| 5,934,525 A * | 8/1999 | Blanchard | A47G 25/183 223/85 |
| 6,357,710 B1 * | 3/2002 | Fielden | A45B 11/00 248/231.51 |
| 7,165,762 B1 | 1/2007 | Duzick | |
| D605,125 S | 12/2009 | Bizzell | |
| 8,087,626 B1 | 1/2012 | Weeden | |
| 8,272,612 B2 * | 9/2012 | Thorpe | A24F 13/22 248/316.7 |
| 8,297,565 B2 | 10/2012 | McLinda | |
| 8,548,319 B1 * | 10/2013 | Mans | G03B 11/045 396/544 |
| 8,602,662 B1 * | 12/2013 | Mans | F16M 11/40 396/428 |
| 8,857,775 B1 | 10/2014 | Clearman et al. | |
| D718,999 S | 12/2014 | Robinson et al. | |

(Continued)

*Primary Examiner* — Noam Reisner
(74) *Attorney, Agent, or Firm* — Carrithers Law Office, PLLC; David W. Carrithers

(57) ABSTRACT

A spring clamp for removably attaching a camera, decoy or other device to a structural support. The clamp includes two opposing arms, each including a handle component and a jaw component. The clamp can be attached to an apparatus when the two jaw components including Inward facing arcuate jaws with gripping teeth and notches are closed around the apparatus. The clamp is provided with a plurality of threaded inserts at selected positions for supporting a device such as a camera. An adjustable and positionable extension may be removably fastened to the camera mount and the camera is detachably coupled to the extension. This allows an article such as a camera to be situated at any desired angle for taking photographs.

40 Claims, 21 Drawing Sheets

(56) References Cited

U.S. PATENT DOCUMENTS

| | | |
|---|---|---|
| 9,144,160 B2 | 9/2015 | Chuang |
| 9,389,491 B2 | 7/2016 | Clearman et al. |
| 2003/0080267 A1 | 5/2003 | Eslick |
| 2004/0232608 A1* | 11/2004 | Wong ............... B25B 5/103 269/249 |
| 2010/0264281 A1 | 10/2010 | Joeben et al. |
| 2011/0308131 A1 | 12/2011 | McLinda |
| 2013/0193288 A1 | 8/2013 | Congdon |
| 2013/0333267 A1 | 12/2013 | Olien |
| 2014/0321909 A1 | 10/2014 | Bain |
| 2014/0332645 A1 | 11/2014 | Brooks |
| 2018/0147439 A1* | 5/2018 | Woods ............ A63B 21/0728 |

\* cited by examiner

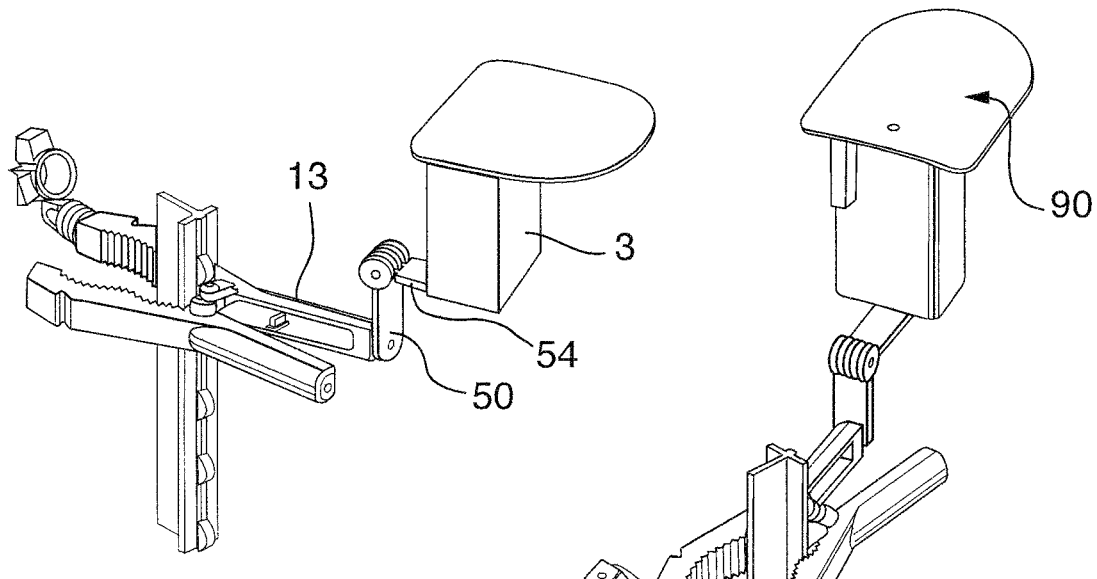
FIG. 25  FIG. 26
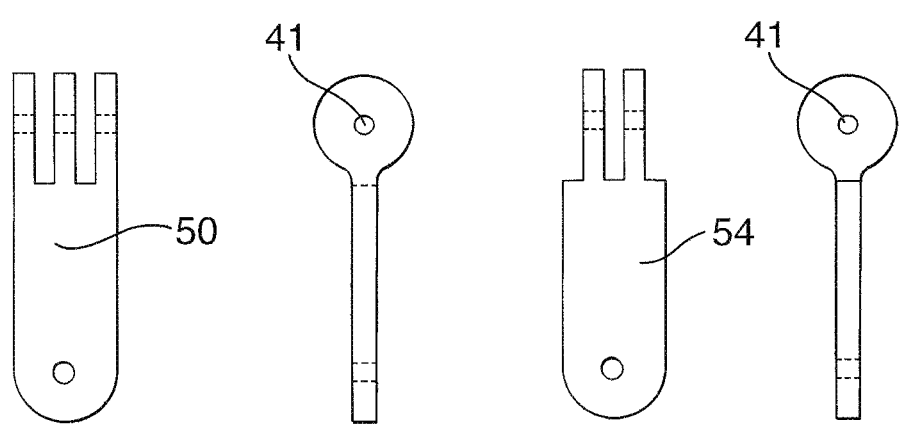
FIG. 27  FIG. 28  FIG. 29  FIG. 30

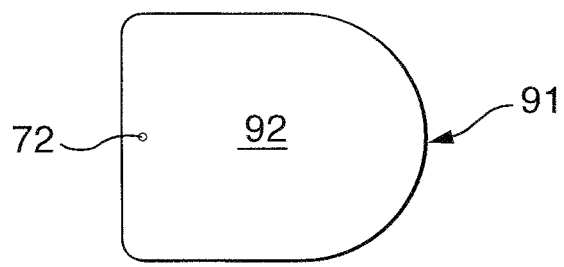
FIG. 31
 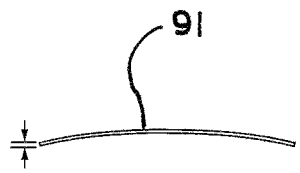
FIG. 32      FIG. 33
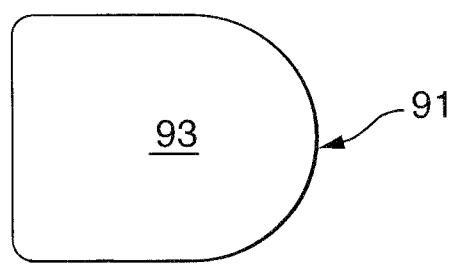
FIG. 34
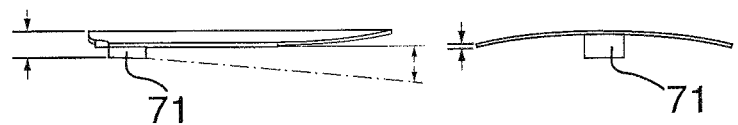 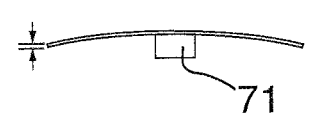
FIG. 35      FIG. 36 ary application is a Continuation-In-Part of U.S. application Ser. No. 16/283,299 filed on Feb. 22, 2019 which claims priority from provisional application Ser. No. 62/634,121 filed on Feb. 22, 2018 both of which are incorporated by reference herein in its entirety.

CLAMP FOR MOUNTING AND POSITIONING AN ARTICLE THEREON

CROSS REFERENCE TO RELATED APPLICATIONS

This application is a Continuation-In-Part of U.S. application Ser. No. 16/283,299 filed on Feb. 22, 2019 which claims priority from provisional application Ser. No. 62/634,121 filed on Feb. 22, 2018 both of which are incorporated by reference herein in its entirety.

TECHNICAL FIELD

The present invention relates to the field of devices used to removably attach other devices to a generally longitudinal structure.

BACKGROUND OF THE INVENTION

The present invention comprises a spring clamp for removably attaching a camera, decoy or other device to a structural support. For simplification, a camera will be designed as the article to mounted in the spring clamp in the following description; however, the clamp functions to hold other articles which need to be adjustably mounted or positionable and supported by a clamp mechanism as well.

Decoy cameras are he Decoy cameras are heavy because they usually include a plurality of batteries. They usually have a threaded mount for use on tripods or stakes. These cameras are motion activated whenever an animal is in range. They usually have a threaded mount for use on tripods or stakes. Such cameras can be set up for overnight monitoring of a known or suspected trail for the purpose of photographing prey or pests such as deer, coyotes, and the cameras can function as security cameras to photograph trespassers.

Surveillance cameras for photographing game animals and other wildlife have become popular as the technology of such cameras has improved. These advanced cameras utilize a relatively inexpensive fully automatic camera which provides automatic focus, flash, aperture and shutter speed and film advance functions. Such cameras are mounted along trails, salt licks, feeders and in other areas known to be frequented by game animals and other wildlife. By using these cameras, hunters are able to use game cameras to identify trophy animals within the study area. The surveillance camera is mounted along a trail or on a fence or gate until the person returns and unloads the film for processing.

These cameras are designed to take a photograph upon sensing an animal within a preselected target area. Sensors for some cameras include photoelectric eyes which sense an interruption in a light beam between emitters and reflectors. Other types of sensors used are infrared sensors which sense the body heat of an animal. The sensitivity of an infrared receiver may be selected so as to trigger the game camera shutter release only upon receiving an infrared intensity above a given threshold, such as a level associated with a large game animal instead of a small animal. Moreover, the game camera is left out in the field during daylight and nighttime conditions and necessitates day/night enable capabilities.

A game camera may include an electro-mechanical device for selective and/or automated switching an optical lens filter for day/night operations or an electro-mechanical device for selective switching between at least one optical lens filter, such as between a day and night optical lens filter, between a first position and a second position in order to selectively insert the optical lens filter into an optical path of the camera.

The camera is typically enclosed in a camera housing, and an electronic control circuit is mounted within the camera housing and operably connected to the camera. The camera housing may be constructed as a main body and a removable cover, each being weatherproof and from an impact resistant plastic. The camera also includes various system resources, such as a memory device and a microprocessor for storing and performing a set of programmable functions. In addition, the camera may include a passive infrared sensor that detects body heat of the animal or group of animals to be photographed. An electro-mechanical device may also enclosed within the camera housing for selectively inserting an optical lens filter, such as day optical filter and a night optical filter, into an optical path of the camera in accordance with light intensity and/or a signal from a user or timer.

Conventional camera mounting systems include U.S. Design Pat. No. D605125 by Bizzell teaching a clamp with arcuate rows of gripping teeth and U.S. Pat. No. 8,857,775 by Clear man et al teaching a clamp with a camera mount.

SUMMARY OF THE INVENTION

The present invention comprises or consists of a spring clamp for removably attaching a camera, decoy or other device to a post, tree, or any convenient roughly longitudinal structure which may be a part of a larger existing structure such as a tree, fence, sign post, for example. A camera system is configured to detachably couple to a camera mount, which in turn can be attached to an apparatus. The camera mount is a spring clamp including two arms, each include a handle component and a jaw component. The spring clamp can be attached to an apparatus when the two jaw components are closed around the apparatus. Inward facing arcuate jaws with gripping teeth and notches are designed to afford the clamp with a secure, grasping capability. The clamp is provided with a plurality of threaded inserts on a plurality of surfaces on the clamp, thus enabling a device, such as a camera, to be securely stationed in a chosen spot on a given structure. The teeth and notches are hard and are capable of digging into tree bark or other soft material covering the roughly longitudinal structure, and the clamp is provided with cushioning material which removably attaches to the inward facing jaws and can thus be used to more firmly secure the clamp to smooth and hard structures such as a pipe or rod. In some cases, an adjustable and positionable camera mount extension is fastened to the camera mount, and the camera system is detachably coupled to the camera mount extension. This allows a mounted camera system to be situated at any desired angle for taking photographs. A heavy clamp is needed to secure the camera. The clamp is spring loaded and includes a gripping tip and inwardly facing arcuate row of teeth forming a arrow head pattern. The front teeth are using for gripping limbs or pipe or the like.

The present invention includes an inner center clamping area with a gripping tip and inwardly facing arcuate row of teeth forming a parabolic pattern from front to back. The back portion includes a center notch to accommodate the notches on a steel post. The last two end notches are squared shaped to fit on the longitudinal flanges of a steel post and provide lateral support. Notches or pegs are disposed inward from the front end of the clamp in order that the distal ends can be tied together with wire or even rubber bands as reinforcement if desired. The camera is held by an adjustable bracket which screws into distal end of one of the handles. Other items can be supported by the clamp such as a mounting block or swivel mount In accordance with the present invention, there is provided a attachment clamp comprising, consisting of, or consisting essentially of a clamp body 12 and a swivel mount 14. The clamp body has a front side, a rear side, a bottom side, a top side, a left side and a right side. The clamp body includes two toothed left and right jaws and two left and right handle grips. At the junction of the left jaw and handle grip is an inward extending hinge. Likewise, at the junction of the right jaw and handle grip is an inward extending hinge. The hinges are over lapped together and a threaded hinge pin is inserted to hold the hinges together. A nut is threaded the hinge pin on the front side thereof.

The threaded hinge pin passes through a coil spring which is captured inside the two hinges. Two outward extending spring arms of the coil spring are captured in the grip handles where upon the spring arms urged the grip handles outward and thus the toothed jaws are urged toward each other.

The clamp includes sixteen female threaded inserts for attaching a decoy camera or any other desired device to the clamp. The threaded inserts are preferably quarter-20 threaded inserts. On the front side are four inserts. On the back side are four inserts. On the right side and left side are four inserts (two on each side). On the top side and bottom side are four inserts (two on each side).

The two jaws and include two arcuate sets of inward facing teeth, and inner set and an outer set. Each of the two sets face toward each other so that when a longitudinal member such as a tree limb, rod or pipe is captured between either set of arcuate teeth, the two jaws urge their teeth toward one another and therefore, firmly grasp the longitudinal member. The longitudinal member need not be smoothly formed as the teeth are urge against whatever surface they contact. Between the hinges and the inner jaws, are two rectangular notches which will receive the opposing flanges of a T-post, as shown in the figures, in particular in FIG. 4. The notches are arranged and sized to firmly grasp the flanges of the T-post. This particular arrangement provides an especially steady grip of the clamp onto a T-post.

A heavy clamp is needed to secure the camera to a structural member such as a post. The clamp is spring loaded and includes a gripping tip and inwardly facing arcuate row of teeth forming a arrow head pattern. The front teeth are using for gripping limbs or pipe or the like. The present invention includes an inner center clamping area with a gripping tip and inwardly facing arcuate row of teeth forming a parabolic pattern from front to back. The back portion includes a center notch to accommodate the notches on a steel post. The last two end notches are squared shaped to fit on the longitudinal flanges of a steel post and provide lateral support. Outward extending notches are disposed inward from the top end of the clamp in order that the distal ends can be tied together with wire or even rubber bands as reinforcement if desired. The clamp body includes a plurality of threaded inserts for connecting various mount. The camera is held by an adjustable swivel mount employing a type of clampable ball and socket joint which screws into any of the threaded inserts in the clamp. Other items can be supported by the clamp such as a mounting block, light, flag, decoy or other desired object.

It is an object of this invention to provide a decoy camera attachment clamp which includes spring loaded toothed jaws which can grasp a roughly shaped longitudinal projection and which contains a plurality of threaded inserts which can hold a variety of items such as a decoy camera.

It is an object of this invention to provide a decoy camera attachment clamp which includes swivel mount for attaching such a decoy camera or other desired object to the attachment clamp. The swivel mount includes a type of ball and socket joint which is fixable in a desired position by a clamping knob.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 25 shows a side view of a rain/sun deflector mounted to the top of a camera mounted to a pivotal cam clamp connector;

FIG. 26 shows a rear view of a rain/sun deflector mounted to the top of a camera mounted to a pivotal cam clamp connector;

FIG. 27 shows a first clamp connector arm of FIG. 25;

FIG. 28 shows a side view of the first clamp connector arm of FIG. 27;

FIG. 29 shows a second clamp connector arm for cooperatively engaging the first clamp connector arm of FIG. 27;

FIG. 30 shows a side view of the second clamp connector arm of FIG. 29;

FIG. 31 shows a top view of the rain/sun deflector panel;

FIG. 32 shows a side view of the rain/sun deflector panel of FIG. 31;

FIG. 33 shows a front view of the rain/sun deflector panel of FIG. 31;

FIG. 34 shows a bottom view of the rain/sun deflector panel;

FIG. 35 shows a side view of the rain/sun deflector panel of FIG. 31 depicting the spacer member disposed between the deflector panel and connector;

FIG. 36 shows a rear view of the rain/sun deflector of FIG. 31 showing the spacer and rear of the deflector panel;

DESCRIPTION OF THE PREFERRED EMBODIMENTS

Figure 1:
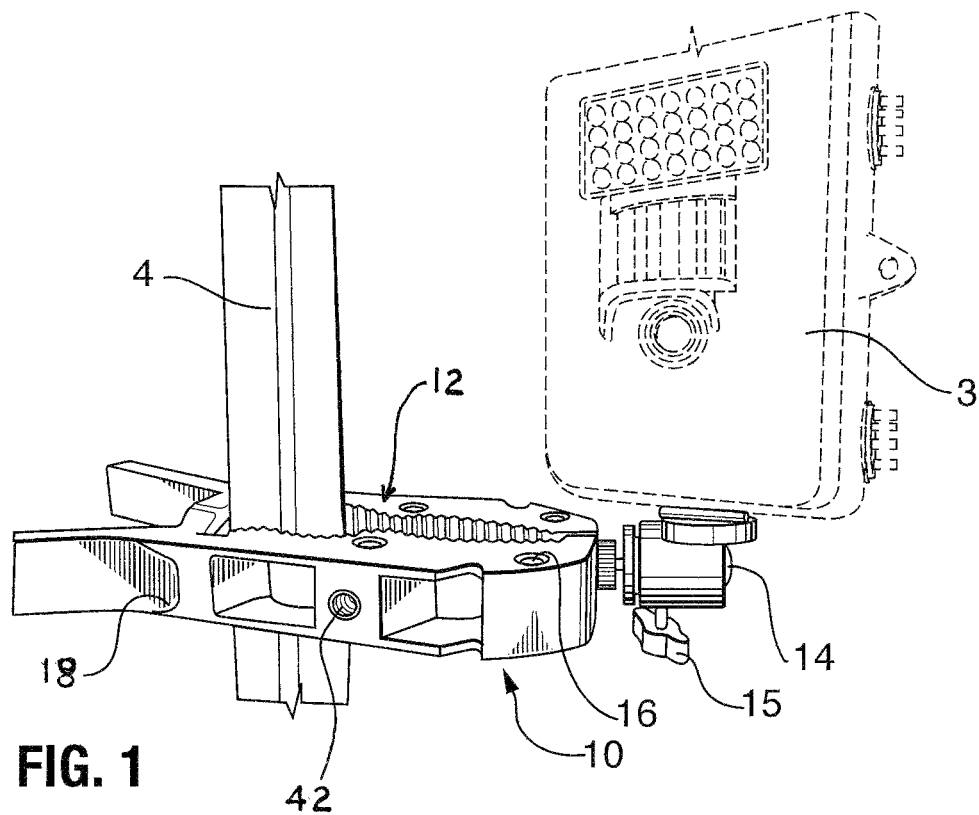
FIG. 1 is a right side view of the attachment clamp attached to a T-post and holding a decoy camera.
Figure 2:
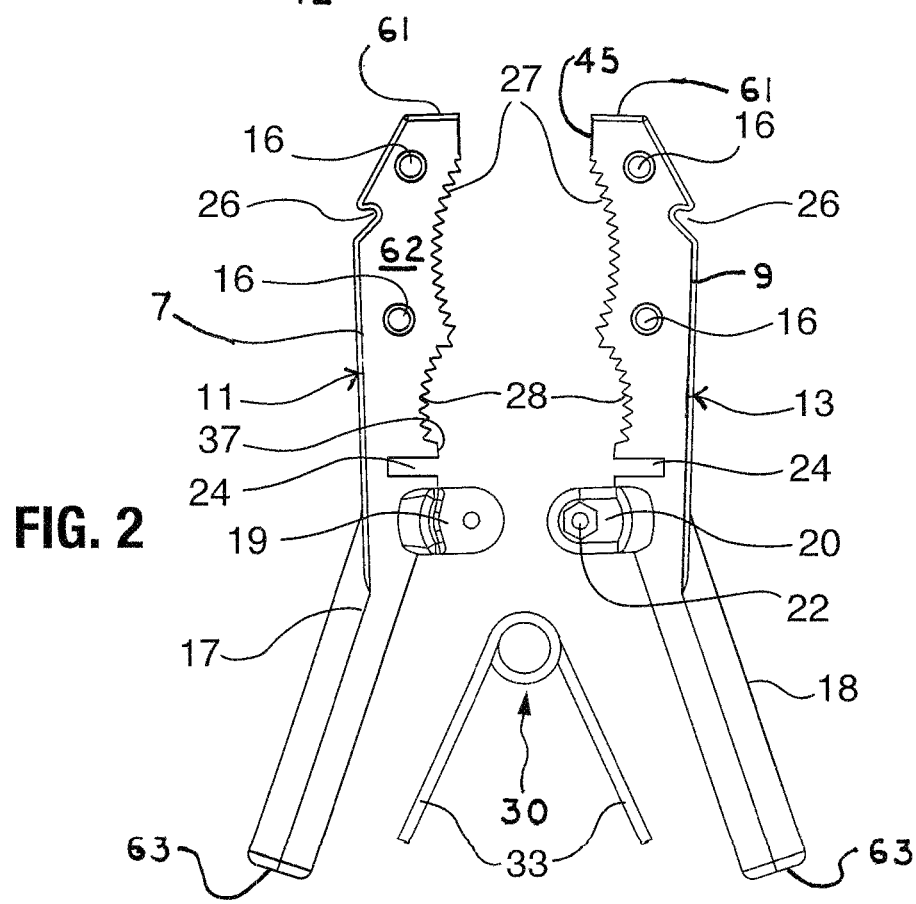
FIG. 2 is a front view of a disassembled attachment clamp.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the Figures. As used herein, the term "about" can be reasonably appreciated by a person skilled in the art to denote somewhat above or somewhat below the stated numerical value, to within a range of +10%.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention comprises or consists of a spring clamp for removably attaching an article such as a camera, decoy or other device to a post, tree, or any convenient roughly longitudinal structure which may be a part of a larger existing structure such as a tree, fence, sign post, or T-post. An article to be supported such as a camera system is configured to detachably couple to a camera mount, which in turn can be attached to an apparatus. The camera is mounted on a connector supported by a spring clamp including two arms, each include a handle component and a jaw component. The spring clamp can be attached to an apparatus when the two jaw components are closed around the apparatus. Inward facing arcuate jaws with gripping teeth and notches are designed to afford the clamp with a secure, grasping capability. The clamp is provided with a plurality of threaded inserts on a plurality of surfaces on the clamp, thus enabling a device, such as a camera, to be securely stationed in a chosen spot on a given structure. The teeth and notches are hard and are capable of digging into tree bark or other soft material covering the roughly longitudinal structure, and the clamp is provided with cushioning material which removably attaches to the inward facing jaws and can thus be used to more firmly secure the clamp to smooth and hard structures such as a pipe or rod. In some cases, an adjustable and positionable camera mount extension is fastened to the camera mount, and the camera system is detachably coupled to the camera mount extension. This allows a mounted camera system to be situated at any desired angle for taking photographs. A heavy clamp is needed to secure the camera. The clamp is spring loaded and includes a gripping tip and inwardly facing arcuate row of teeth forming a arrow head pattern. The front teeth are using for gripping limbs or pipe or the like.

In accordance with the present invention, there is provided an attachment clamp 10 which will support a stud or threaded member such as a swivel mount or connector 14. Each cooperatively engaging clamp arm 11, 13 has a front distal end 61, a rear distal end 63, a first face or first side 62, a second face or second side 64, a first edge 65, a second edge 66. The clamp body 12 includes two arms opposing joined arms 11 and 13 defining a first jaw 7 and second cooperatively engaging jaw 9 respectively. A first handle grip 17 extends from jaw 7 and a second handle grip 18 extends from jaw 9. At the junction of the jaw 7 and handle grip 17 is an inward extending hinge 19. Likewise, at the junction of the jaw 9 and handle grip 18 is an inward extending hinge 20. The hinges are over slapped together and a threaded hinge pin 21 is inserted to hold the hinges together. A nut 22 is threaded the hinge pin 21 on the front side thereof.

As shown in the figures, clamp arm 11 has a first side including a projecting rounded or convex shoulder 70 which engages an arcuate flange 71 extending from a first side of an opposing arm 13 forming a hinge between the first side of arm 11 and arm 13. Likewise, clamp arm 13 has a second side including a projecting rounded or convex shoulder 72 which engages an arcuate flange 73 extending from a second side of an opposing arm 11 forming a hinge between the second side of arm 11 and arm 13. The cooperatively engaging shoulder and flange members help support the hinge having a pin extending therethrough for pivotal movement. Moreover, the staggered arrangement of having opposing shoulders on opposite sides of the hinge further strengthens the hinge arrangement.

The threaded hinge pin 21 passes through spring means such as a coil spring 30 having a coil held by the hinge pin between the two hinges 19 and 20 disposed between the arcuate flanges 71 and 73. A pair of opposing outward extending spring arms 33 of the coil spring 30 are captured in channels 34 and locked into place by notched flanges 35 formed on the inner surface of the grip handles 17 and 18 where upon the spring arms urged the grip handles 17 and 18 outward and thus the toothed or ribbed jaws 11 and 13 are urged toward each other.

As shown in the figures, each clamp arm 11 and 13 include a jaw, 7 and 9 respectively, each one including an inner edge surface including a notch 24 at the proximate end for receiving a flange of a T-post, a flat bench stop 37 to limit closure of the clamp and grip the side walls of a T-post flange, and at least an inner arcuate toothed or ribbed section 28 having ridges or teeth 29 extending from the first side to the second side normal to the longitudinal direction of the arm 11, 13. One preferred embodiment as shown in the figures includes an outer arcuate toothed or ribbed section 27 having means for gripping comprising ridges or teeth extending from the first side to the second side normal to the longitudinal direction of the arm. A flat, gnarled, and/or a fine ribbed pattern can be optionally formed on the inner edge surface of the jaw tip 45. The proximate or inner ribbed section is more curved and of a shorter length than the outer ribbed section. It is contemplated that the inner and outer ribbed section can include dimples spikes, ridges, a diamond pattern, or any type of raised or rough surface to enhance the grip of the surface including a polymeric coating or rubber coating and combinations thereof.

The arcuate sets of inward facing teeth providing a gripping and holding surface so that when a longitudinal member such as a tree limb, rod or pipe is captured between either set of arcuate teeth, the teeth of the two jaws 11 and 13 are biased toward one another by a spring means and therefore, firmly grasp the longitudinal member. The longitudinal member need not be smoothly formed as the teeth are urge against whatever surface they contact. Between the hinges and the inner jaws 28, are two post notches 24 sized and shaped to receive the opposing flanges of a T-post 4, and is generally rectangular as shown in the figures. The post notches 24 are arranged and sized to firmly grasp the flanges of the T-post. This particular arrangement provides an especially steady grip of the clamp onto a T-post.

The clamp includes a plurality of female threaded inserts cooperatively engaging threaded rods for attaching a decoy camera or any other desired device to the clamp 12. The threaded inserts are preferably quarter-20 threaded inserts but may be any other desired size of threads or a cavity forming a socket or a selected size or cross sectional shape such as a square, rectangle, triangle, hexagon, octagon, or cylindrical for cooperative engagement with a projecting member of an article to be supported thereby. On the first face or side 62 of the jaw portions 7 and 9 are four inserts 16. The outer edges 65 and 66 of the jaw portions 7 and 9 include an insert 42. The outer edge of the handle portions 17 and 18 optionally includes an insert 40. The front end 61 of the clamp arms 11 and 13 include an insert 43 disposed in the distal end of the jaws 7 and 9. The rear end 63 of the clamp arms 11 and 13 include an insert 44 disposed in the distal end of the handles 17 and 18.

As shown in FIGS. 17-22, the front end of the jaws and the rear end of the handles include an insert within a mounting flange 75 comprising a collar 77 extending therefrom with a flanged outer lip 79 for cooperatively engaging a swivel connector or other article. The insert is disposed within the insert mounting flange for attaching an article thereto.

A pair of arcuate backward angled notches 26 are formed in the outer surface of each arm near the distal end for aligning and holding a cord or wire wrapped around the jaws 7 and 9 after attachment to a support member.

As an option the jaws 7 and 9 may include channels 49 formed therein on the sides to reduce weight and the handles 17 and 18 may include webbing 51 or channels 53 formed in the interior surface to reduce weight while providing the requisite structural support.

Figure 3:
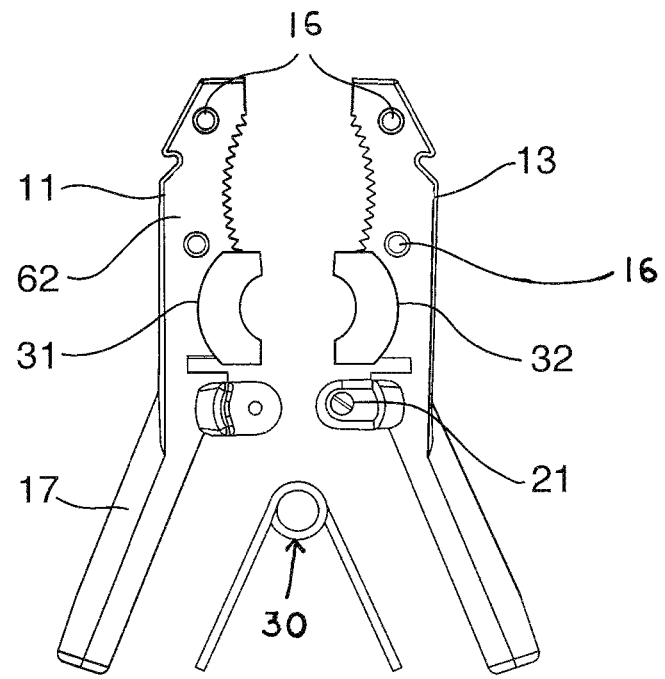
FIG. 3 is rear view of an attachment clamp showing elastomeric jaw covers.
Figure 4:
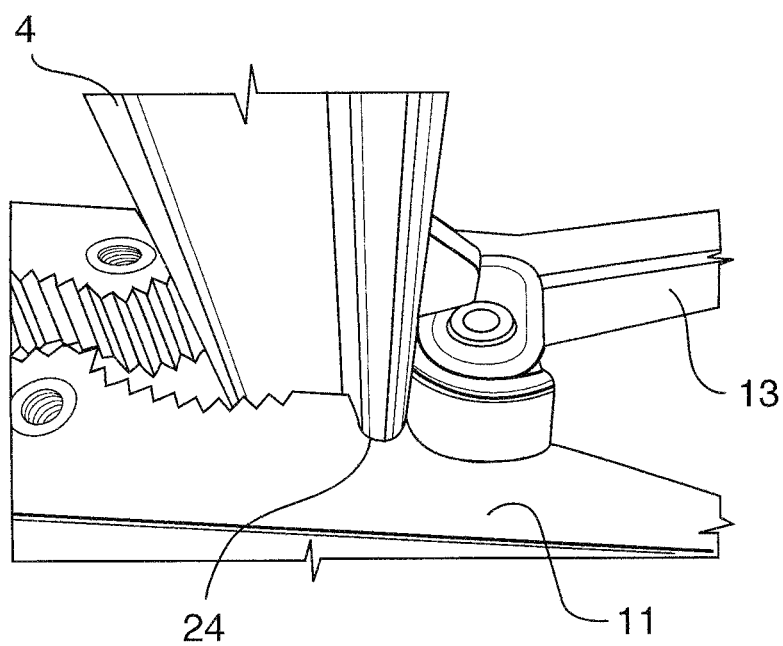
FIG. 4 is a left side perspective view of the attachment clamp on a T-post.
Figure 5:
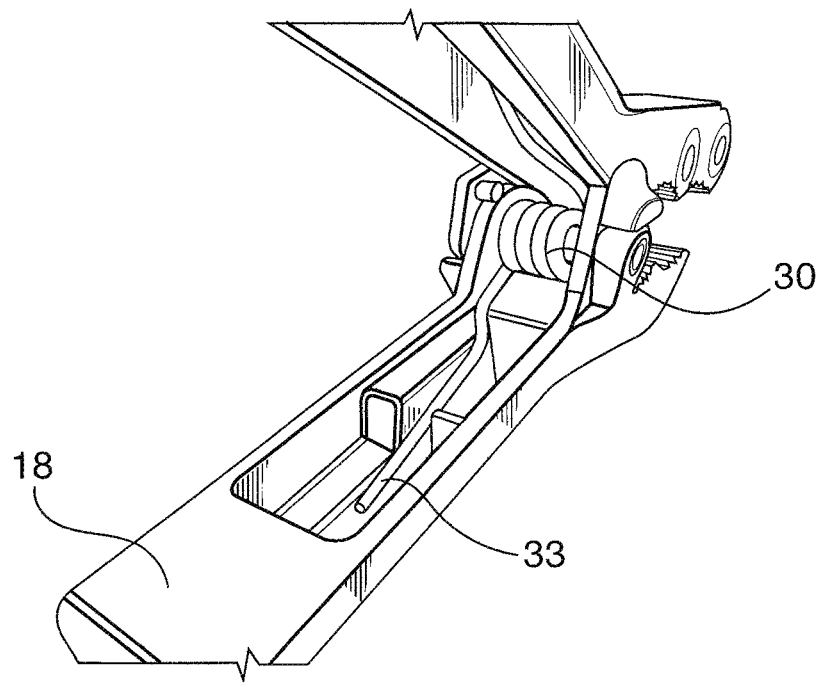
FIG. 5 is a bottom perspective end view of the clamp showing the spring.
Figure 6:
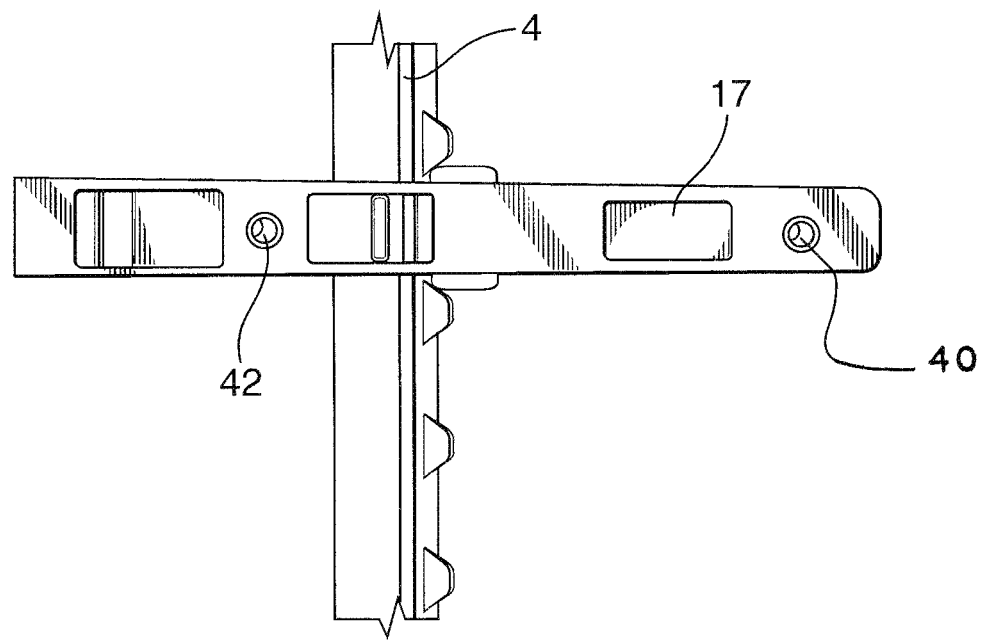
FIG. 6 is a left side view of the clamp showing two threaded inserts.
Figure 7:
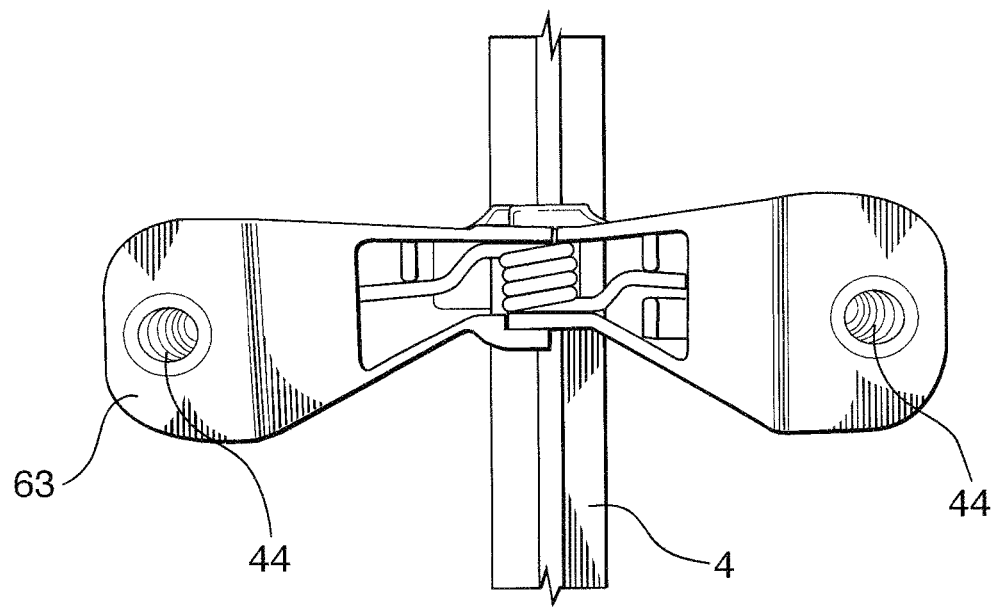
FIG. 7 is a bottom view showing a threaded insert on the ends of the clamp.
Figure 8:
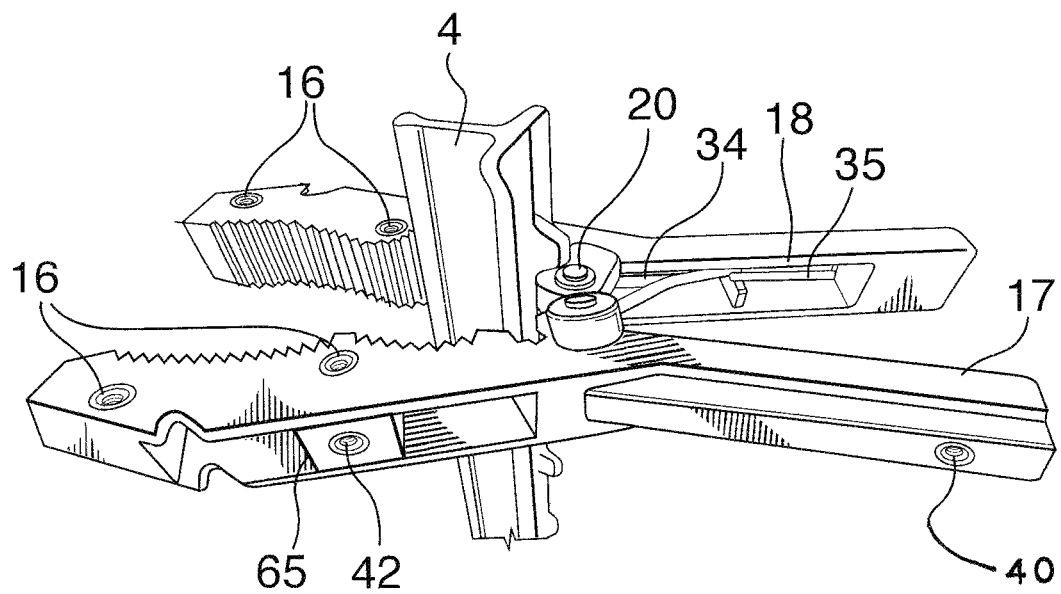
FIG. 8 is a left side view of the clamp.
Figure 9:
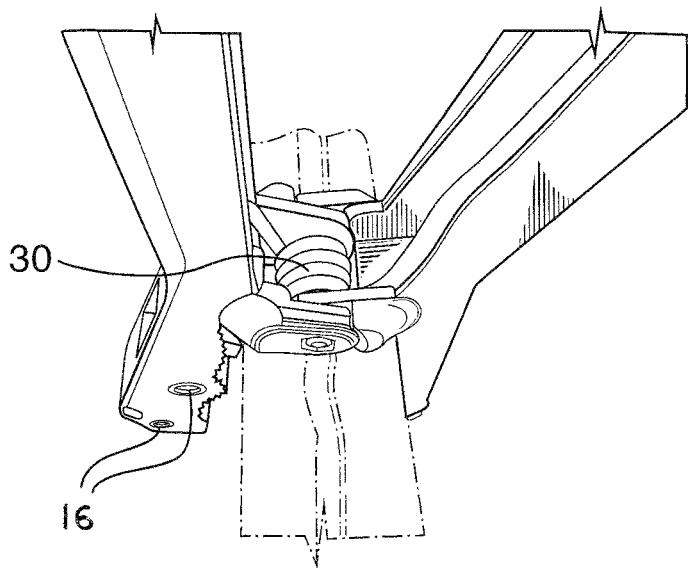
FIG. 9 is a perspective bottom view of the clamp.
Figure 10:
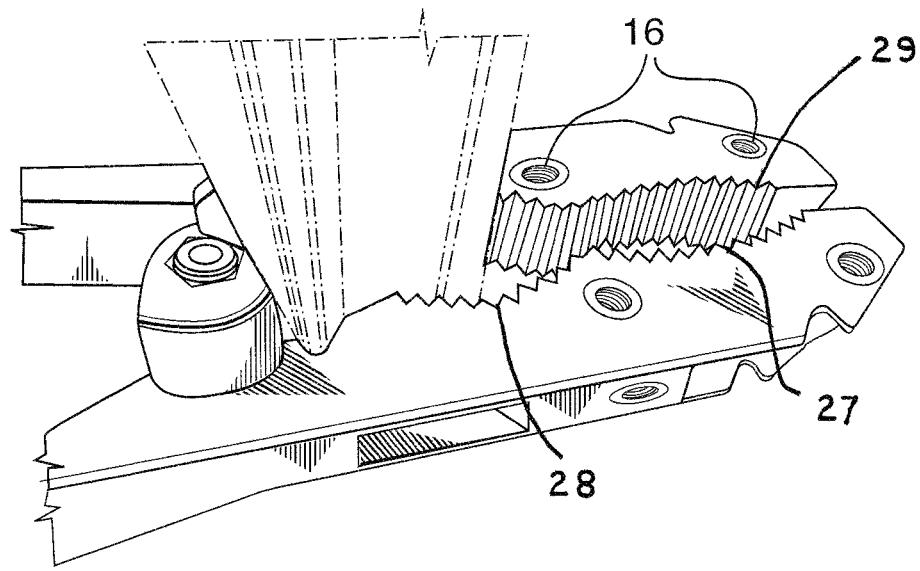
FIG. 10 is a right perspective view of the clamp.
Figure 11:
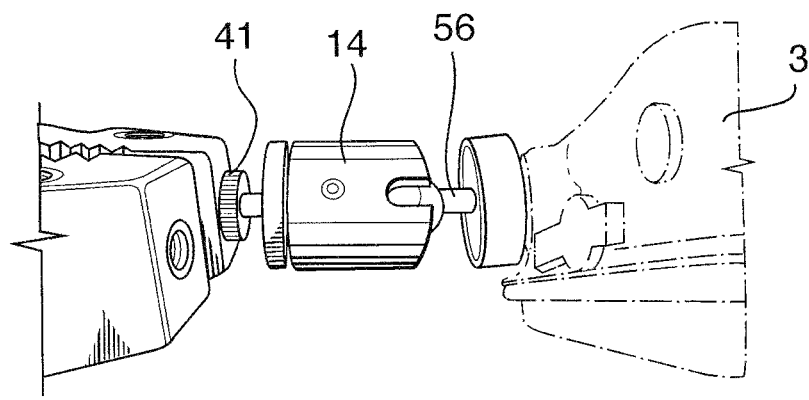
FIG. 11 is a right side view of the clamp with the swivel mount holding a decoy camera.
Figure 12:
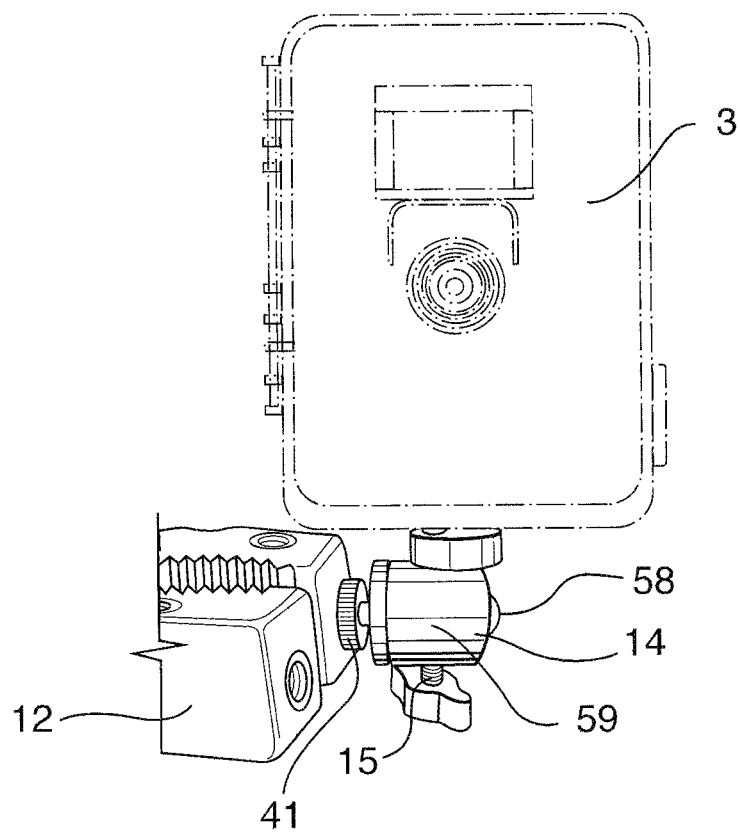
FIG. 12 is a right side view of the clamp and swivel mount holding the camera in an upright position.
Figure 13:
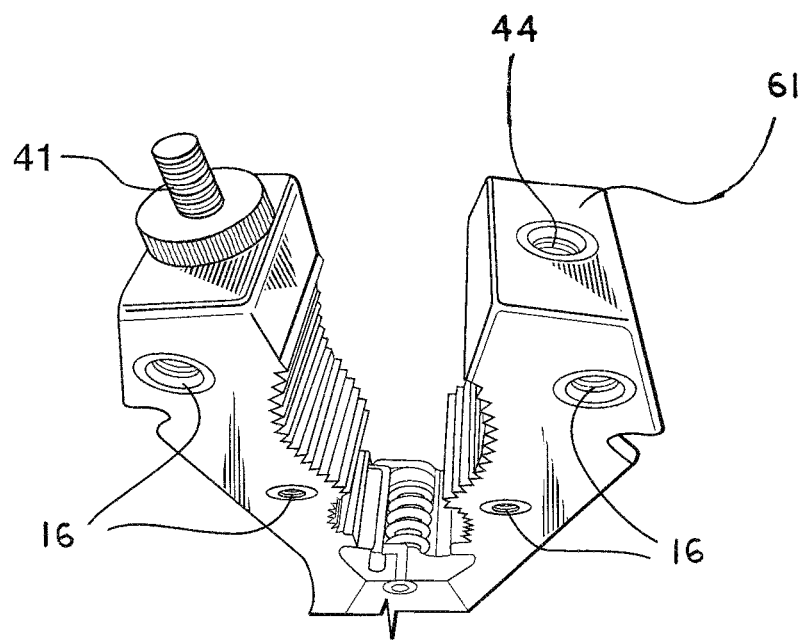
FIG. 13 is a top perspective view of the clamp with a stud threaded into one of the top threaded inserts.

When attaching a device to a hard smooth rod, the arcuate rows teeth will hold but may slip. A tighter grip is provided when the elastomeric jaw covers 31 and 32 are placed over the two arcuate rows of teeth 28 as shown in FIG. 3. When the clamp is installed onto a smooth rod, the pair of rubber or elastomeric jaw covers 31, 32 will deform against the surface of the rod and grip it tightly.

Figure 14:
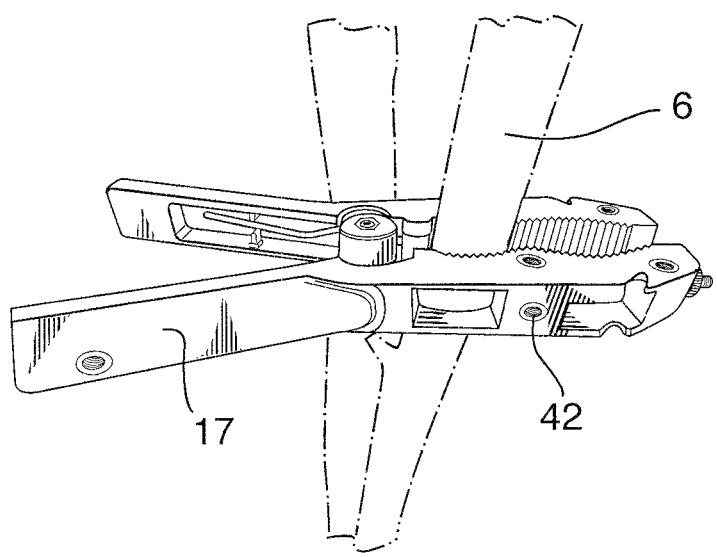
FIG. 14 is a right perspective view of the clamp installed onto a tree trunk.
Figure 15:
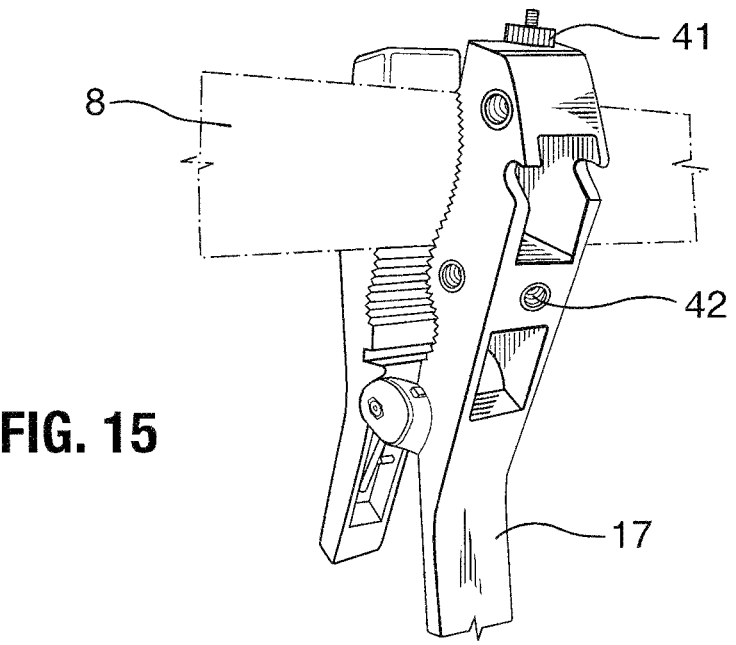
FIG. 15 is a front perspective view of the clamp installed on a horizontal pipe.

FIG. 14 shows the clamp installed onto the trunk of a small tree 6. The arcuate rows of teeth are well suited to firmly grasp the trunk of the tree 6. FIG. 15 shows the clamp installed onto a horizontal pipe 8. Depending on the surface conditions of the pipe, the installation may be secure enough, but perhaps, the inclusion of elastomeric covers 31 and 32 would provide a more secure installation.

Figure 16:
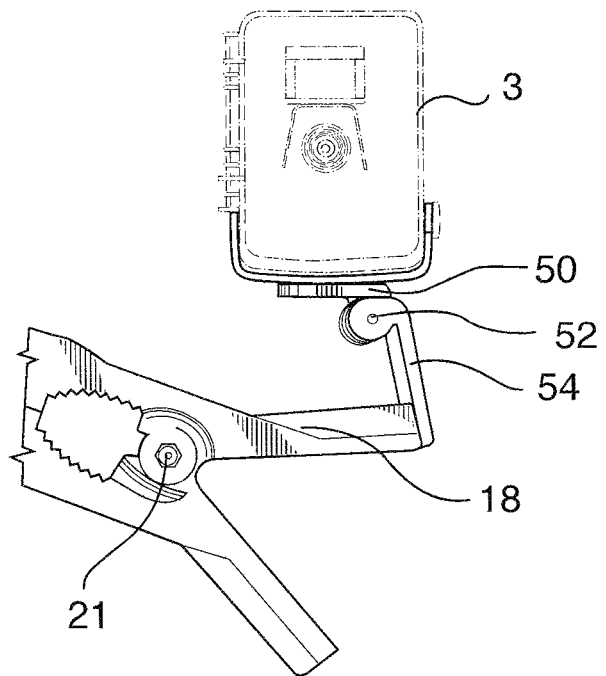
FIG. 16 is a front view of a clamp with an alternate none swiveling mount comprising two angle brackets connected by a common screw.
Figure 17:
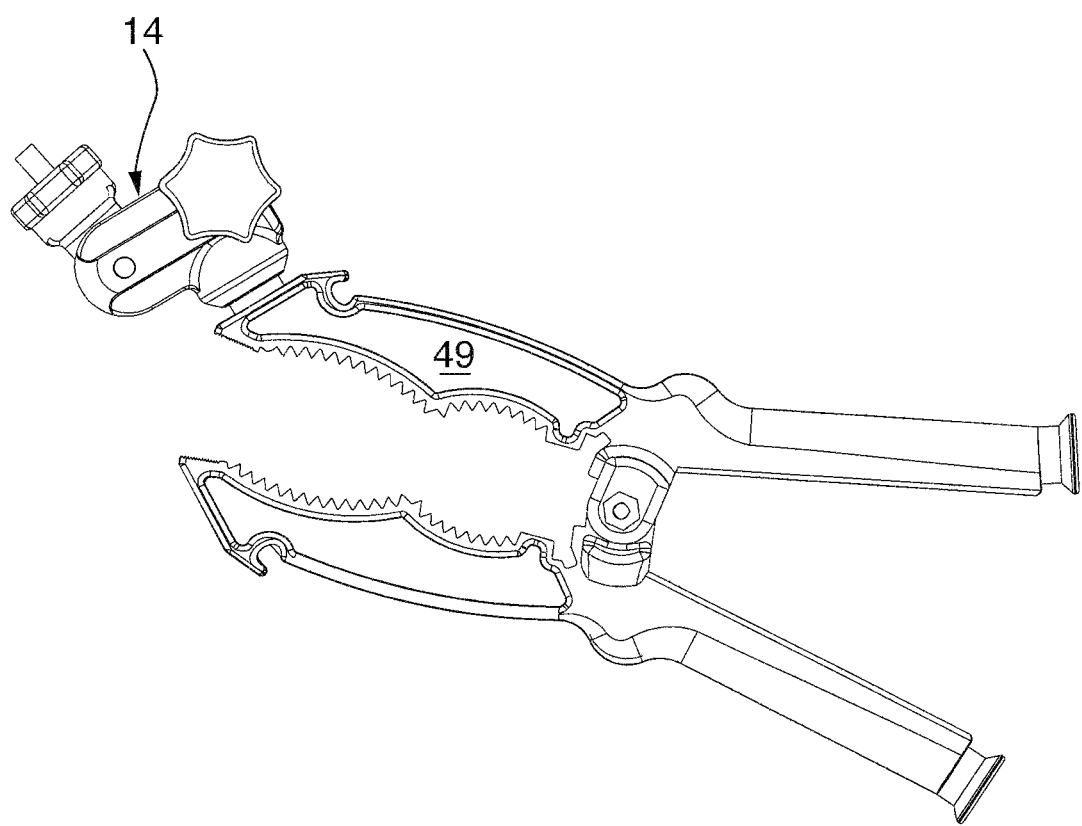
FIG. 17 is a perspective view of a clamp including a clamp connector extending from a tip thereof.
Figure 18:
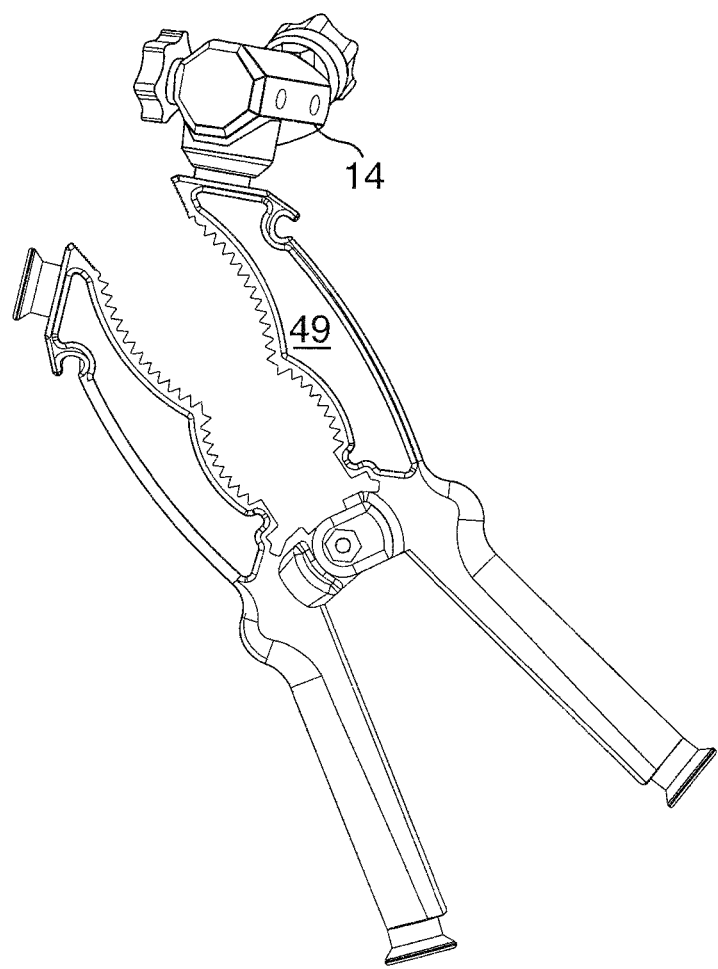
FIG. 18 is a side view of the clamp of FIG. 17.
Figure 19:
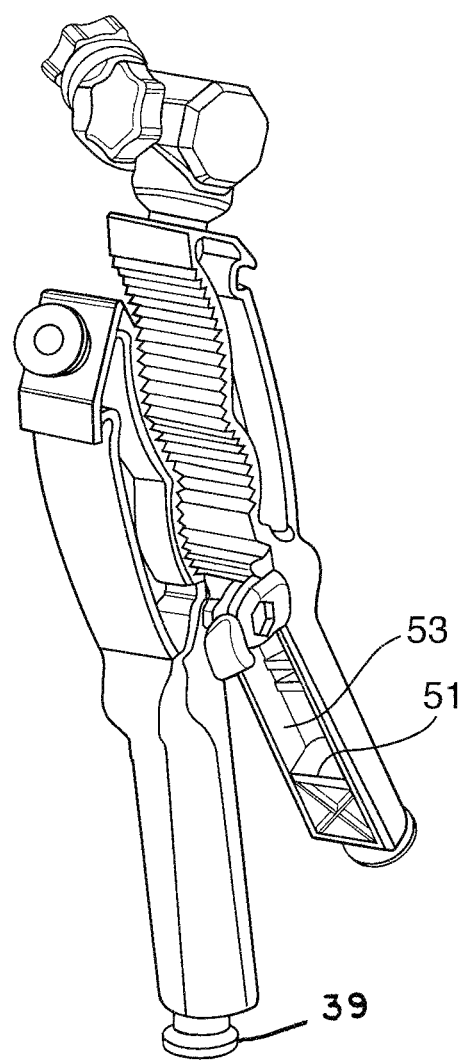
FIG. 19 is an elevational view of the clamp and connector of FIG. 17.
Figure 20:
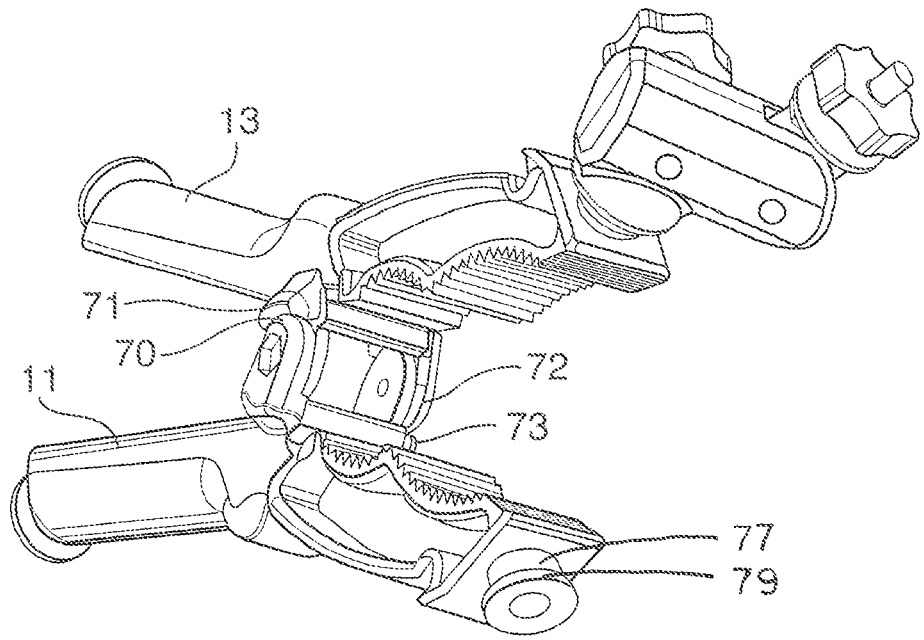
FIG. 20 is a front elevational view of the clamp and connector of FIG. 17.
Figure 21:
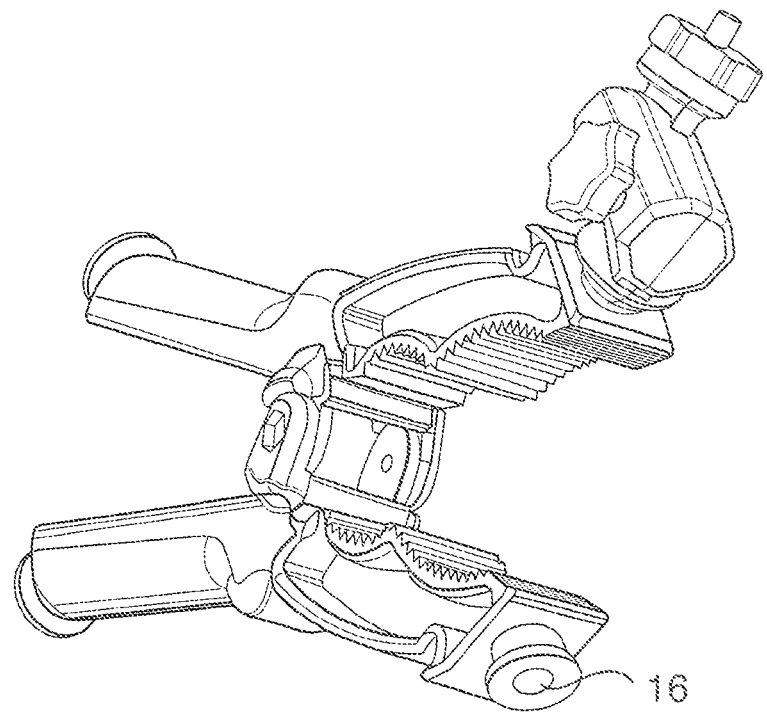
FIG. 21 is a front elevational view of the clamp of FIG. 17 with the connector shown at an angle depicting the swivel ball member.
Figure 22:
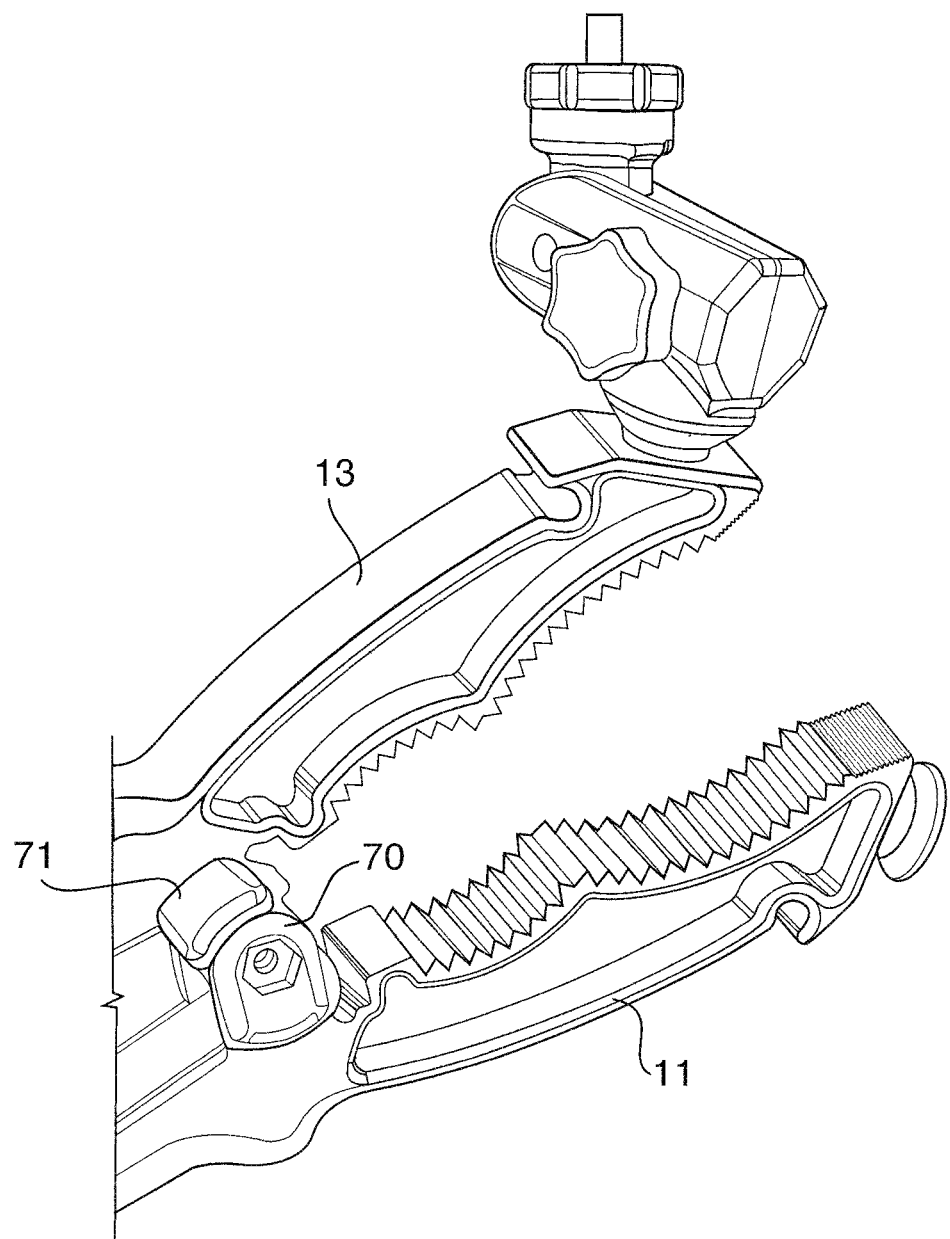
FIG. 22 is a perspective view showing the clamp of FIG. 17, with the inner surface of jaw including a notch, flat bench stop, inner arcuate ribbed section, outer arcuate ribbed section, and gnarled or fine ribbed pattern on the tip.
Figure 23:
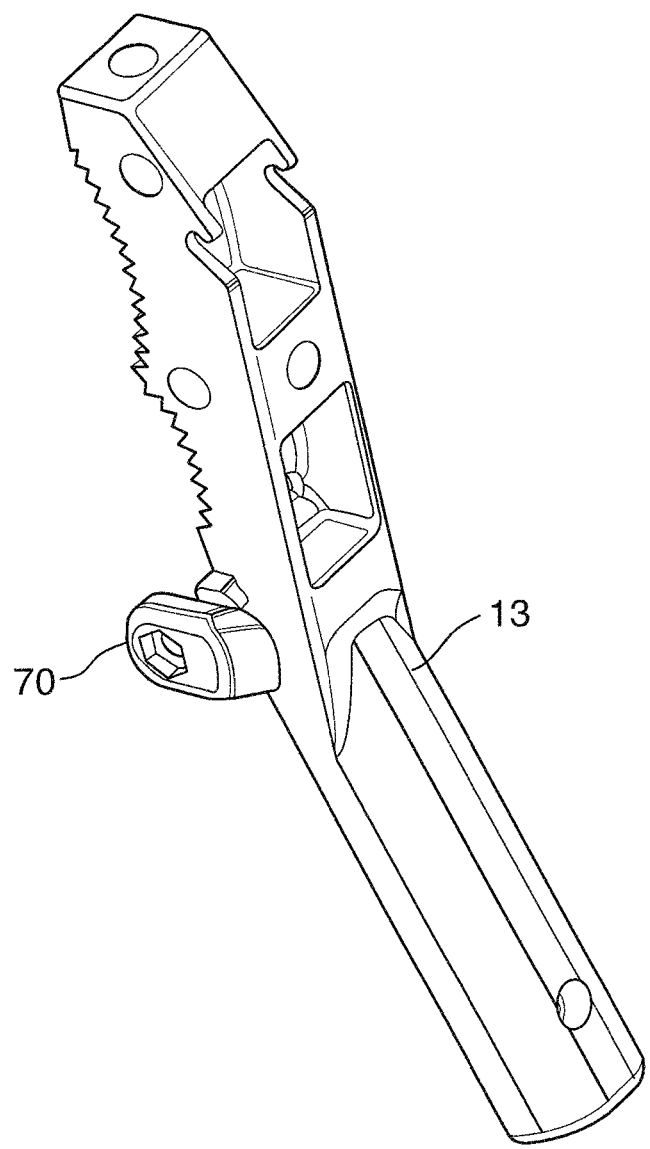
FIG. 23 is a perspective view of a clamp arm showing the outer convex shoulder of the hinge in cooperative pivotal engagement with a mating arcuate concave flange for supporting the hinge.
Figure 24A:
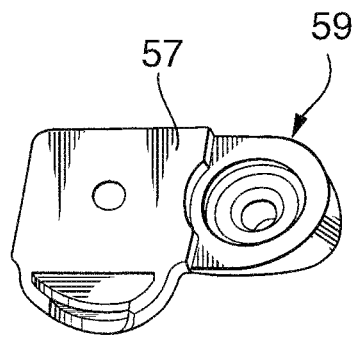
FIG. 24(a) shows a right side of a connector member.
Figure 24B:
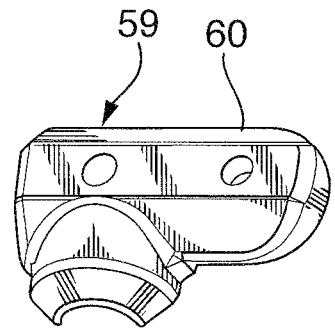
FIG. 24(b) shows a left side of a connector member.
Figure 24C:
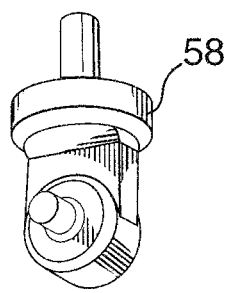
FIG. 24(c) shows a ball mount with stud held between the connector members of FIGS. 24(a) and 24(b)
Figure 24D:
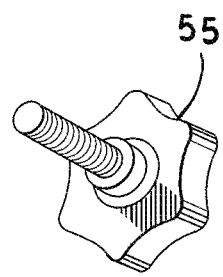
FIG. 24(d) shows a threaded knob for adjusting the pressure exerted on the ball mount by the connector members.
Figure 24E:
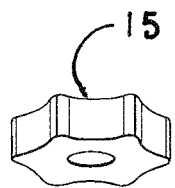
FIG. 24(e) shows a nut for cooperatively engaging the stud shown in FIG. 24(c)
Figure 37:
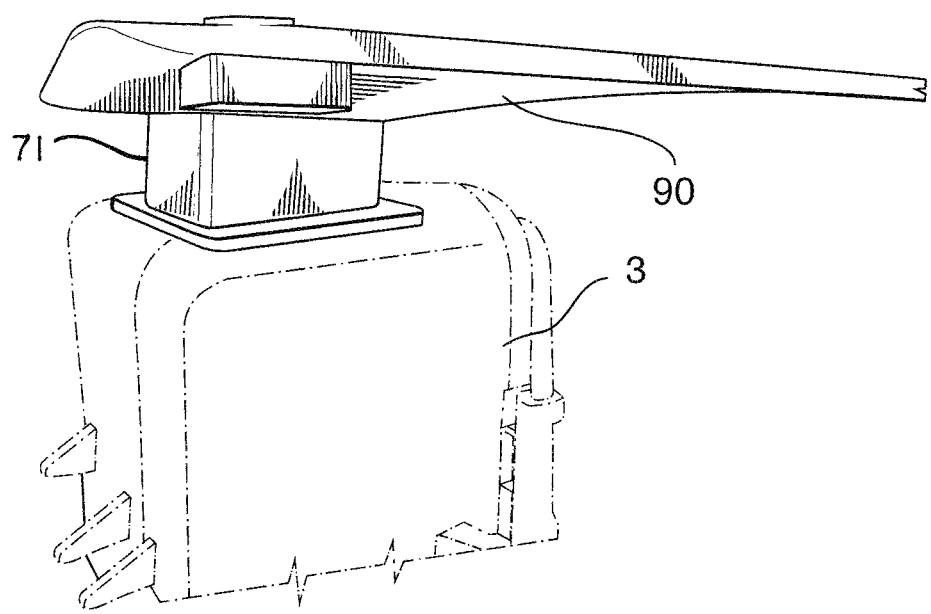
FIG. 37 is a perspective view showing a deflector mounted to a spacer atop a camera.
Figure 38:
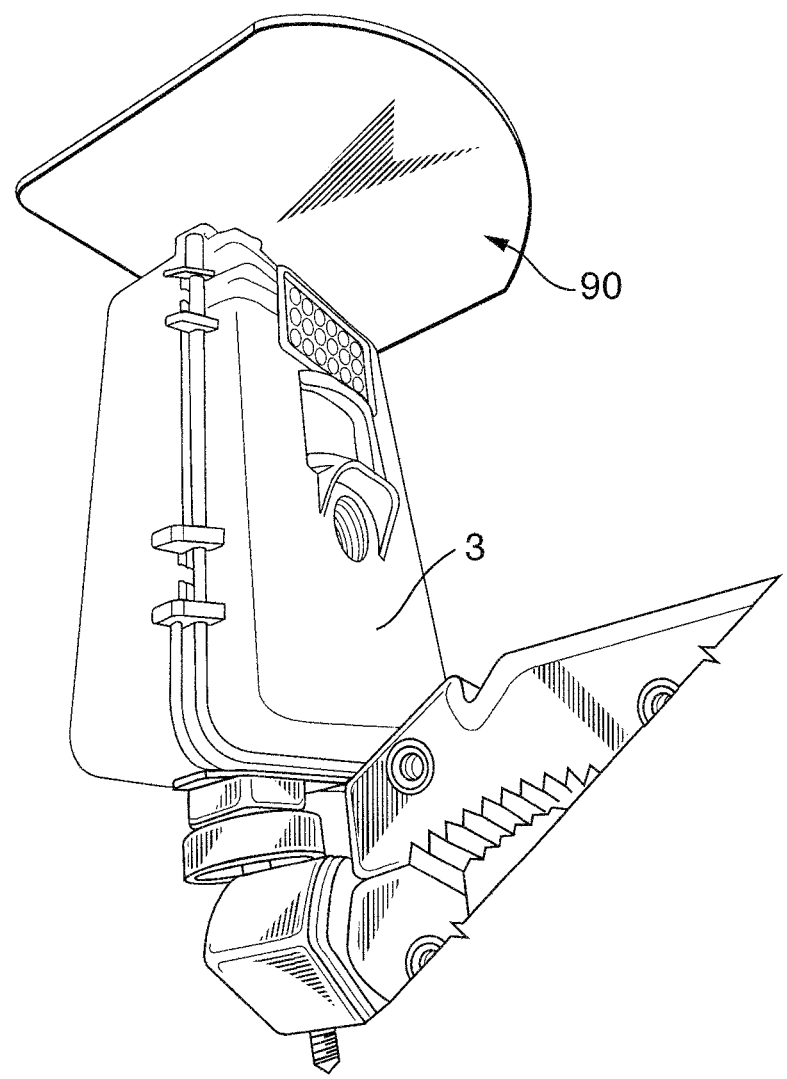
FIG. 38 is a perspective view showing a connector extending from a clamp supporting a camera having a rain/sun deflector.
Figure 39:
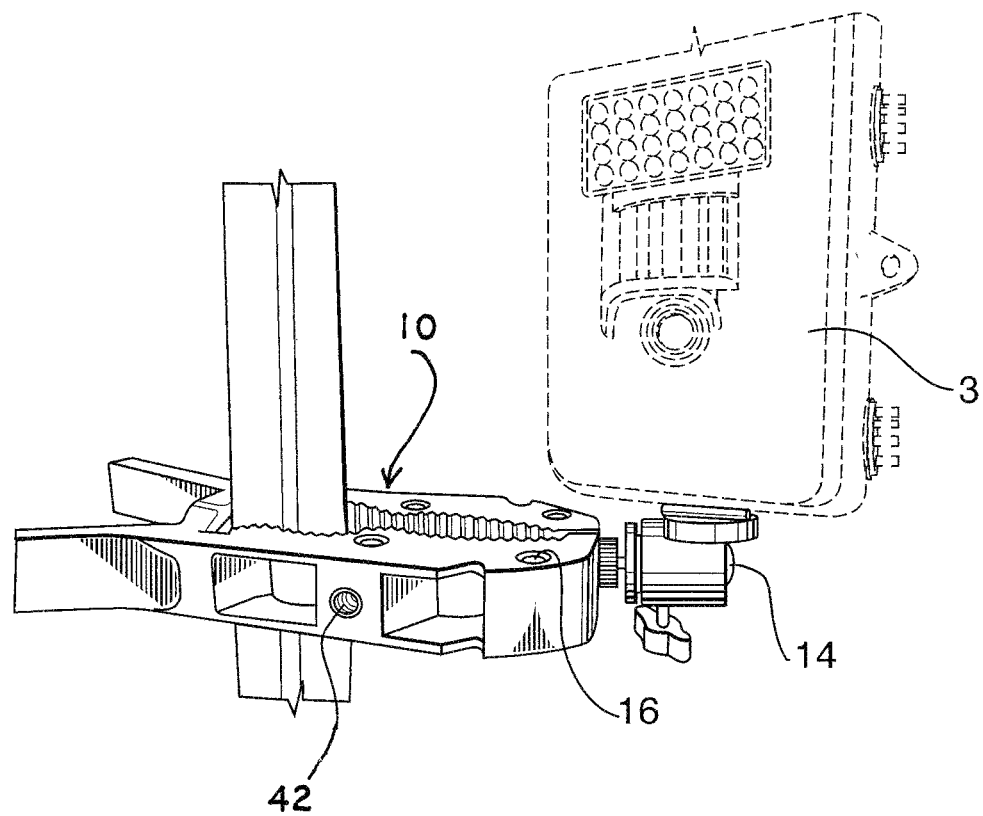
FIG. 39 shows a clamp removably attached to a T-post supporting a connector hold a camera.
Figure 40:
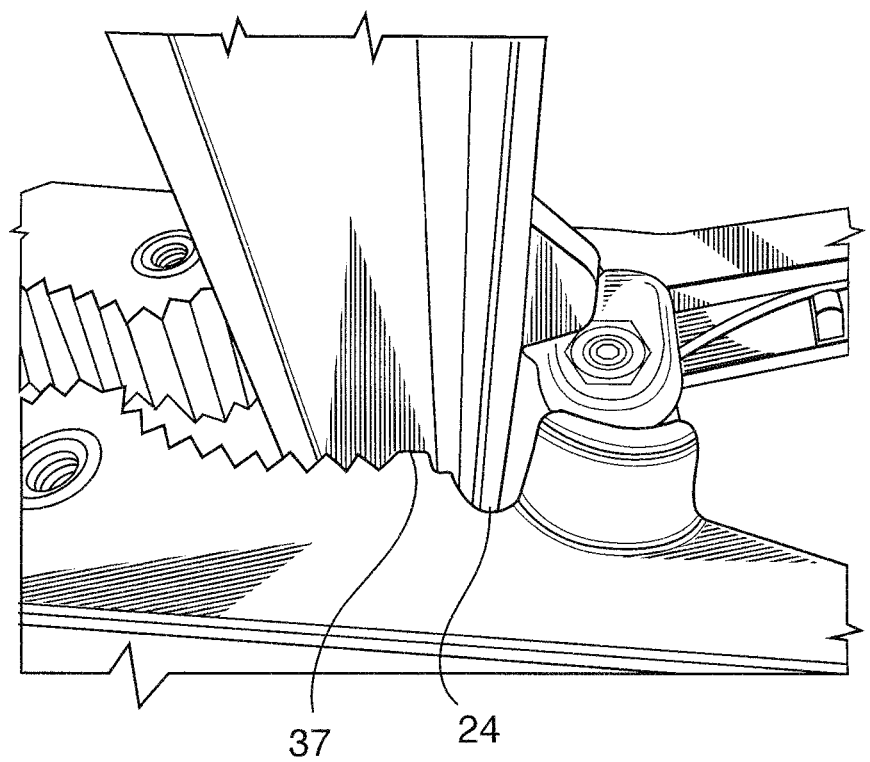
FIG. 40 is an enlarged view showing the side flange of the T-post cooperatively engaging the notch of the clamp jaw and the flat bench of the jaw abutting the side of the T-post, and the hinge abutting the back surface of the T-post.

As shown in FIG. 16 a non-swivel mount containing two angle brackets 50 and 54 are hinged together with a hinge pin 52. The non-swivel mount is connected at one end to a threaded insert in the clamp 12 with a screw and at the other end to a camera 3 with another screw. A mounting cap 39 having a projecting member such as a threaded shaft can be joined to the insert providing a base having means for mounting such as an insert for mounting a stud or cooperatively engaging another member extending from an article to be supported thereon such as a camera.

As illustrated in the figures, a swivel mount 14 includes a split body 57, 60 into which is threaded screw 41 which is also threaded into one of the threaded inserts of the clamp 12. The body 59 contains an adjustable pivoting member 58 including spherical portion which is free to swivel within the body 59 until a threaded knob assembly 15 including a clamping knob 55 is used for holding the split body portions 57 and 60 together is tightened. The spherical member 58 includes and outward extending threaded longitudinal member 56 which is firmly threaded into the decoy camera or other device which a user wants to be mounted. The user may loosen the clamping knob 15 and swivel the camera to a desired arrangement and then tighten the knob 15 to hold the camera in place.

FIGS. 25-39 show an adjustable camera visor 90 for mounting onto a game camera 3 to protect the lens form rain and snow and to provide a sun shade preventing sunlight from interfering with photographs. As shown the visor 90 includes a top or canopy 91 having a top surface 92 and bottom surface 93 comprising a thin section of material such as a plastic having generally straight side and rear edges with rounded corners and a front edge curved having a parabolic shape. It is mounted over a top surface of said camera and has an arcuate shape curving downward from a center portion toward a left and right side edge. A cross-sectional view depicts an arched or arcuate top wherein the side edges are lower than the center of the canopy providing shading of a game camera lens and drainage from rain. The canopy mounted to the top of the game camera using a block 71 as a spacer means and rivet or screw 72 to adjustably secure the canopy to the spacer block which has a flat bottom surface and a top surface formed or cut at an angle of up to 20 degrees and preferably about 5 degrees in order to angle the visor downward with respect to the top of the game camera. Rotation of the visor is provided by the screw attachment allowing adjustment of the visor in a 360 degree pattern in the x-axis and adjustment in the y-axis of a selected angle based on the angle of the spacer block disposed between the visor and the camera mounting point. The front portion defines a visor extending past the front of the camera to shade the lens and prohibit the formation of shadows due to sunlight shining in the camera lens.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

I claim:
1. An attachment clamp comprising:
a clamp including a left clamp member including an opposing left jaw extending from a left handle having a first inwardly extending left hinge having a throughbore;
said clamp including a right clamp member opposing said left clamp member, said right clamp member including an opposing right jaw extending from a right handle having a second inwardly extending right hinge having a throughbore;
said first inwardly extending left hinge and said second inwardly extending right hinge cooperatively engage forming a junction of said right clamp member and said left clamp member with a hinge pin extending through said throughbore connecting said left hinge and said right hinge;
spring means in cooperative engagement with said left hinge of said left clamp member and said right hinge of said right clamp member releasably biasing said left jaw against said right jaw;
said left clamp jaw and said right clamp jaw including at least one threaded insert means for holding and supporting an article;
said left jaw and said right jaw having an inwardly curving inner edge including at least one ribbed section extending outward from said left and said right hinges;
a pair of opposing notches formed in an inward edge of said left jaw and said right jaw for cooperatively engaging a flange there between; and
including at least one socket means in a front distal end of said left jaw and a front distal end of said right jaw, at least one socket means in a rear distal end of said right handle and a rear distal end of said left handle.

2. The attachment clamp of claim 1, wherein said first inwardly extending left hinge and said second inwardly extending right hinge cooperatively engage and overlap one another at forming a junction of said right clamp member and said left clamp member with a hinge pin extending through said throughbore connecting said left hinge and said right hinge.

3. The attachment clamp of claim 2, wherein said spring means held by said hinge pin between said left hinge of said left clamp member and said right hinge of said right clamp member comprises a coil spring including a pair of opposing outward extending spring arms having a distal end captured within a channel and locked into place by a notched flange formed on an inner surface of said handle and said hinge pin passes through a coil of said coil spring aligned with said throughbore of said right hinge and said left hinge.

4. The attachment clamp of claim 1 including a removable and adjustable and positionable extension cooperatively with means for engaging said insert and including means for removably and adjustably mounting an article thereon.

5. The attachment clamp of claim 4 including a camera mounting thereto.

6. The attachment clamp of claim 5 wherein said camera includes a canopy mounting over a top surface of said camera, said canopy having an arcuate shape curving downward from a center portion toward a left and right side edge and having a parabolic shaped front portion defining a visor extending past the front of the camera to shading the lens and prohibiting formation of shadows formed by to sunlight shining in the camera lens.

7. The attachment clamp of claim 6, further including a spacer block comprising a wedge shaped member disposed between a top surface of said camera and said canopy, said wedge positioning said canopy and said visor at a selected forward angle extending pass said camera.

8. The attachment clamp of claim 6, said spacer block mounting to said camera with means for rotatable adjustment of said spacer block on said camera.

9. The attachment clamp of claim 1, said inner edge of said left jaw and said right jaw further comprises at least a curved inner arcuate ribbed section and a curved outer arcuate ribbed section.

10. The attachment clamp of claim 9, said ribbed section of said arcuate ribbed section including a means for gripping extending from a first side to a second side edge normal to the longitudinal direction of said left jaw and said right jaw.

11. The attachment clamp of claim 9 wherein at least one of said inner arcuate ribbed section and said outer arcuate ribbed section is of longer length.

12. The attachment clamp of claim 9 wherein at least one of said inner arcuate ribbed section and said outer arcuate ribbed section includes a greater curvature.

13. The attachment clamp of claim 1, said ribbed section of said arcuate ribbed section including a means for gripping extending from a first side to a second side edge normal to the longitudinal direction of said left jaw and said right jaw.

14. The attachment clamp of claim 1, wherein said means for gripping of said ribbed section is selected from the group consisting of a plurality of gnarls, teeth, ribs, dimples spikes, ridges, a diamond pattern, a raised surface, a rough surface, and combinations thereof.

15. The attachment clamp of claim 1 further including a material for enhancing the grip of said left jaw and said right jaw selected from the group consisting of an elastomer, a polymeric coating, a rubber coating, or combination thereof.

16. The attachment clamp of claim 1 including a mounting cap having means for cooperatively engaging said insert, said mounting cap comprising a base having means for mounting and cooperatively engaging an article to be supported thereon.

17. The attachment clamp of claim 1, further including holding means disposed at the distal end of said right clamp jaw and said left clamp jaw selected from the group consisting of notches, pegs, and combinations thereof.

18. The attachment clamp of claim 1, wherein said plurality of inserts selected from the group including a rear insert extending from a rear end of said handle, a front insert extending from a front end of said jaw, a side insert extending from said jaw, an insert of said front side, and insert on said back side, an insert on said right side, and insert on said left side, and combinations thereof.

19. The attachment clamp of claim 18, wherein said inserts are threaded for receiving a threaded bolt.

20. The attachment clamp of claim 18 further including a swivel mount for mounting said article thereon.

21. The attachment clamp of claim 20, wherein said swivel mount comprises a split body having first and second body portions and including an adjustable pivoting member having a spherical member free to swivel within said split body and said split body including opening defining a socket for cooperative pivoting engagement with said insert mounting flange, and a clamping knob holding said first and said second split body portions together, and said spherical member including an outward extending threaded longitudinal member for cooperatively engaging an article.

22. The attachment clamp of claim 20, wherein said article comprises a camera.

23. The attachment clamp of claim 1, wherein said inserts are threaded for receiving a threaded bolt.

24. An attachment clamp comprising:
a clamp including a left clamp member including an opposing left jaw extending from a left handle having a first inwardly extending left hinge having a throughbore;
said clamp including a right clamp member opposing said left clamp member, said right clamp member including an opposing right jaw extending from a right handle having a second inwardly extending right hinge having a throughbore;
said first inwardly extending left hinge and said second inwardly extending right hinge cooperatively engage forming a junction of said right clamp member and said left clamp member with a hinge pin extending through said throughbore connecting said left hinge and said right hinge;
spring means in cooperative engagement with said left hinge of said left clamp member and said right hinge of said right clamp member releasably biasing said left jaw against said right jaw;
said left clamp jaw and said right clamp jaw including at least one socket means for holding and supporting an article;
said left jaw and said right jaw having an inwardly curving inner edge including at least one ribbed section extending outward from said left and said right hinges;
a pair of opposing notches formed in an inward edge of said left clamp jaw and said right clamp jaw for cooperatively engaging a flange there between;
said socket means for holding an article comprises a plurality of threaded inserts disposed within said clamp body for holding and supporting an article having means for cooperatively engaging said threaded insert; and
including at least one insert in a front distal end of said left jaw and a front distal end of said right jaw, at least one insert in a rear distal end of said right handle and a rear distal end of said left handle, at least one insert in a side face of said left jaw and at least one insert in a side face of said right jaw, and at least on insert in an outer edge of said left jaw and at lease one insert in an outer edge of said right jaw.

25. The attachment clamp of claim 24, wherein said means for gripping of said ribbed section is selected from the group consisting of a plurality of gnarls, teeth, ribs, dimples spikes, ridges, a diamond pattern, a raised surface, a rough surface, and combinations thereof.

26. The attachment claim of claim 24 wherein said left jaw and said right jaw having a front inwardly curving inner edge and a rear each one including at least one ribbed section extending outward from said left and said right hinges.

27. The attachment clamp of claim 24, said inner edge of said left jaw and said right jaw further comprises at least a curved inner arcuate ribbed section and a curved outer arcuate ribbed section.

28. The attachment clamp of claim 24 further including retaining means disposed inward from the front end of said left clamp jaw and said right clamp jaw selected from the group consisting of notches, pegs, and combinations thereof for cooperatively engaging binding means.

29. The attachment clamp of claim 24, said socket means selected from the group consisting of a plurality of female threaded inserts, a cavity forming a socket of a selected size or cross sectional shape of a square, a rectangle, a triangle, a hexagon, an octagon, a cylinder, and combinations thereof.

30. The attachment clamp of claim 24 further including two elastomeric jaw covers configured to be placed over said two inner set of arcuate rows of teeth said two elastomeric jaw covers coming together when said jaws are urged together where upon a combination of said two elastomeric jaws has a circular aperture formed therein having a diameter less than a diameter of a pipe onto which said clamp combination is to be installed.

31. The attachment clamp of claim 24 including a game camera.

32. The attachment device of claim 24, further including a rotatable visor mounting to a spacer block at a selected angle affixed to a top surface of said game camera.

33. The attachment clamp of claim 32, wherein said article comprises a camera.

34. An attachment clamp comprising:
a clamp body having a front side, a rear side, a bottom side, a top side, a left side and a right side;
said clamp body includes two toothed jaws, a left jaw and a right jaw and two handle grips, a left handle grip and a right handle grip;
at a junction of said left jaw and said left handle grip is a first inward extending hinge, at a junction of said right jaw and said right handle grip is a second inward extending hinge, said hinges overlap one another, and a hinge pin rotatably connects said hinges;
said hinge pin passes through a coil spring which is captured inside said two hinges, two outward extending spring arms of said coil spring are captured in said left handle grip and said right handle grip, said spring arms urging said left handle grip and said right handle grip outward and thus said left and right toothed jaws are urged toward each other;
said clamp including a plurality of inserts disposed within mounting flanges for attaching an article to said clamp body in a front end of at least one jaw and in at least a rear end of at least one handle;
said left jaw and said right jaw including two arcuate sets of inward facing teeth, an inner set and an outer set, each of said two sets facing toward each other; and
disposed between said first inwardly extending hinge and said second inwardly extending hinges and said left and said right inner jaws are two notches sized to receive opposing flanges of a T-post.

35. The attachment clamp of claim 34, said plurality of inserts is at least one of a pair of rear mounting inserts extending from a rear end of said handles, a pair of front inserts extending from a front end of said jaws, a side insert extending from said jaw, an insert in said front side, an insert in said back side, an insert in said right side, or insert in said left side.

36. The attachment clamp of claim 34, wherein said inserts are threaded for receiving a threaded bolt.

37. The attachment clamp of claim 34 further including a swivel mount for mounting said article thereon.

38. The attachment clamp of claim 37, wherein said swivel mount comprises a split body having first and second body portions and including an adjustable pivoting member having a spherical member free to swivel within said split body and said split body including opening defining a socket for cooperative pivoting engagement with said insert mounting flange, and a clamping knob holding said first and said second split body portions together, and said spherical member including an outward extending threaded longitudinal member for cooperatively engaging an article.

39. The attachment clamp of claim 38, wherein said article comprises a camera.

40. The attachment clamp of claim 37, wherein said article comprises a camera.

* * * * *